Nov. 22, 1938.                G. E. BODENHAMER                2,137,225
                        SHAPING TOOL FOR SAW TEETH
                           Filed June 20, 1936
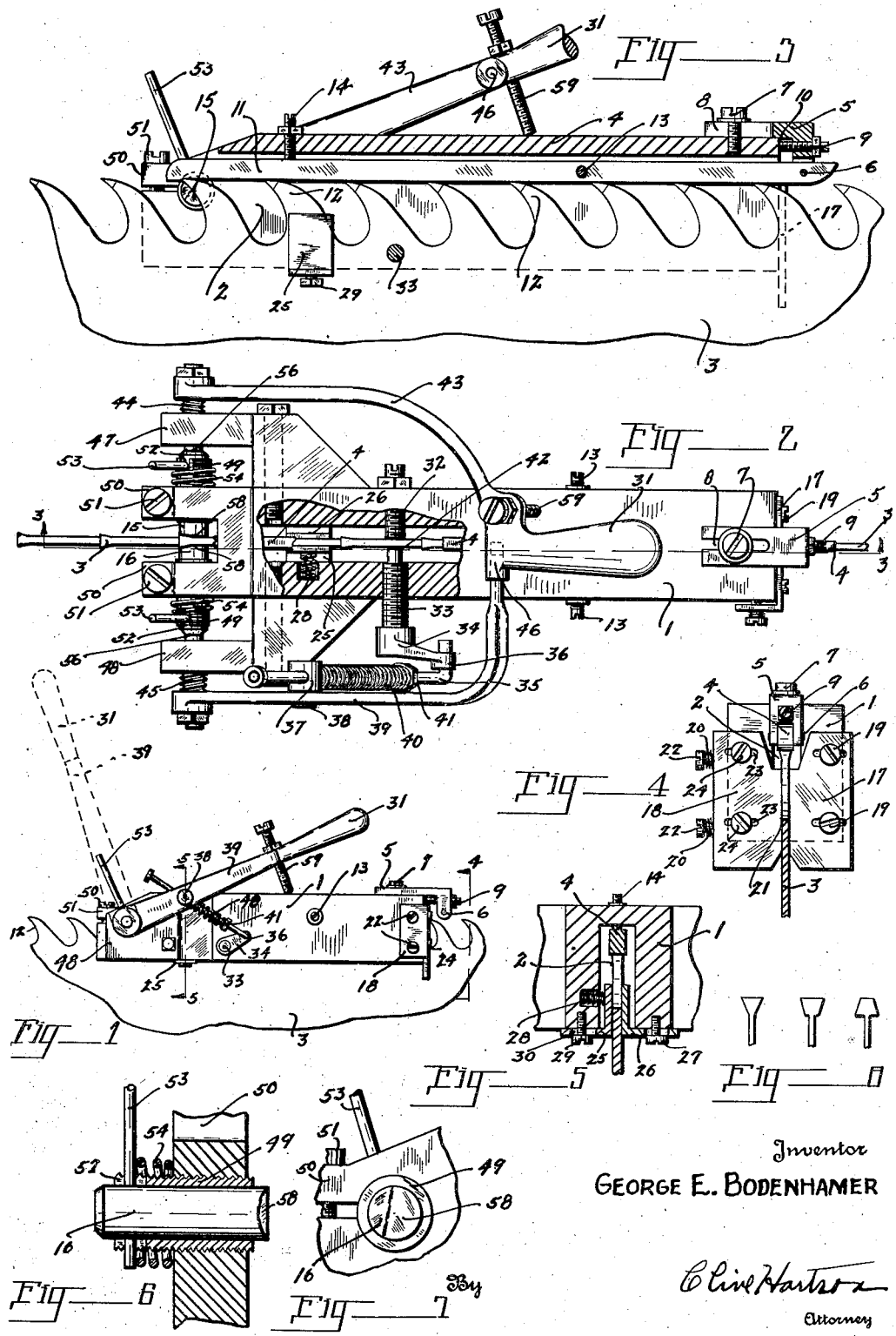
Inventor
GEORGE E. BODENHAMER Patented Nov. 22, 1938

2,137,225

UNITED STATES PATENT OFFICE 2,137,225

SHAPING TOOL FOR SAW TEETH

George E. Bodenhamer, Klamath Falls, Oreg.

Application June 20, 1936, Serial No. 86,386

4 Claims. (Cl. 76—53)

This invention relates to shaping tools for shaping the points of the teeth on saws, and is particularly adapted to be used on band saws as commonly used in saw mills and the like.

The primary object of the invention is to provide a method of changing the shape of the teeth by rotating the dies within the shaping tool to different positions, thereby changing or creating different shaped teeth.

Another object of this invention is to change the shape of the teeth without having to remove the dies from the shaping tool.

A further object of the invention is to provide a locking clamp for clamping the tool relative to the saw tooth, automatically after the tool has been positioned relative to the tooth.

A still further object of this invention is to provide a one piece tooth stop and rest that can be readily adjusted to the proper position and constructed of a material that will withstand the wear developed by the saw.

These and incidental objects will be apparent in the drawing, specification and claims to follow.

Referring to the drawing:

Figure 1 is one of my new and improved tooth shapers, shown mounted upon a saw.

Figure 2 is a plan view of Figure 1, partially broken away, for convenience of illustration.

Figure 3 is a sectional side view taken on line 3—3 of Figure 2, looking in the direction indicated.

Figure 4 is an end view of the guide arrangement used for guiding the shaper along the saw, the same being taken on line 4—4 of Figure 1.

Figure 5 is a sectional view of a spring tension guide arrangement taken on line 5—5 of Figure 1.

Figure 6 is a fragmentary sectional side view of one of the dies used for shaping the teeth.

Figure 7 is an end view of one of the dies showing the face of the die.

Figure 8 is a lay-out of different shaped teeth that may be made with this shaper by simply revolving the dies within the shaper.

In the drawing:

The body of the shaper is indicated by numeral 1, having a longitudinal slot 2 for receiving the saw 3. A tooth stop and tool rest 4 is pivotally mounted to the adjustable bracket 5 by the pin 6. The bracket 5 is adjustable longitudinally of the body 1 by loosening the screw 7 working within the slot 8 and positioning the screw 9 which bears against the end of the body portion at 10. The screw 9 absorbs the shock and assures permanent positioning of the stop 11 as it contacts the teeth 12. Screws 13 position the stop-bar 4 relative to the saw teeth 12. An adjusting screw 14 is provided for adjusting the end 11 of the tool rest bar 4 to position the teeth relative to the dies 15 and 16. Guide plates 17 and 18 position the tool relative to the saw. The plate 17 is rigidly fixed to the end of the body portion 4 by the screws 19. The plate 18 is tensioned against the saw 3 at 21 by the springs 20 associated with the screw 22. The plate 18 has slots 23 loosely fitting underneath the screws 24 permitting free movement of the plate 18. Due to the construction and operation of the guide plates 17 and 18 it is easy to place the tool on the saw after which it is held with a snug sliding fit relative to the saw. Similar guides 25 and 26 are mounted within the opposite end of the slot 2. The guide 26 is fixedly adjustable by the screw 27 while the guide 25 is tensioned against the saw by the spring 28 forcing the same towards the saw. The shoulder screw 29 retains the clamp in position allowing the slot 30 to work freely thereunder. After the shaper has been placed as shown in Figures 1, 2 and 3, the handle 31 will be in position as shown by the dotted lines in Figure 1 and by pulling the same to the right it will clamp the shaper solidly to the saw in its first initial travel by the following described mechanism.

A centering screw or anvil 32 is permanently adjusted. A screw-jack 33, having a coarse thread, is revolved by the initial travel of the handle 31 by the action of the crank 34 being revolved by the connecting rod 35, having its one end journaled in the crank 34 at 36 and its opposite end passing through the wrist pin 37 which is pivotally mounted at 38 within the arm 39 of the handle 31. A spring 40 which is adjustable by the adjustment 41 forces the connecting rod 35 against the crank 34 revolving the jack 33 and clamping the saw at 42. This prevents any movement of the shaper when pressure is applied to the dies 15 and 16 in the following manner.

The handle 31 is fixedly mounted to the screw-jacks 44 and 45 by the arms 39 and 43. The arm 39 is slidably positioned at 46 within the handle to compensate for the action of the screw-jacks 44 and 45 working within the bracket arms 47 and 48. Referring to Figure 6, the die 15 is slidably mounted within the threaded sleeve 49. The sleeve 49 is clamped within the bracket 50 by the screws 51 with sufficient snugness to prevent the easy turning of the sleeve. The outward end of the sleeve has slots 52 for co-acting with the lever 53, which is fixedly mounted within the die 15. The spring 54 tends to force the die 15 out of engagement with the saw 2 when the screw-jacks 44 and 45 are revolved within the brackets 47 and 48 backing them off away from the ends 56 of the dies.

In order to change the shape of the teeth the levers 53 are revolved to different positions changing the relation of the die faces 57 relative to the saw teeth, after these dies have been revolved to the proper position the pulling down of a handle 31, from the dotted position in Figure 1, will force the screw-jacks 44 and 45 inwardly against the ends 56 of the dies 15 and 16 forcing them together against the saw tooth as shown at 58. An adjustable stop screw 59 limits the amount of travel of the handle 31 and the space between the ends of the dies when they are brought together.

As stated before the main object of this invention is to provide a saw shaper that will make different shaped tooth points without removing the shaping dies from the shaper, and I do not wish to be limited to the particular form of embodiment just described as my invention may take other forms of embodiment still coming within the scope of the claims to follow.

I claim:

1. A tool for shaping saw teeth comprising a grooved body, a member seating within the groove and connected to the body by a pivotal connection adjustable longitudinally of the body, threaded members threaded into the body for positioning the member laterally of the groove, means for laterally positioning the body upon a saw, sleeves threaded in opposite sides of the body, dies slidably mounted within the sleeves, said dies each having a plurality of different faces, levers for turning the dies so that corresponding faces engage a saw tooth, the sleeves having notches in which the levers are seatable to prevent turning of the dies, springs between the levers and the body to withdraw the dies from co-engagement with a saw tooth, brackets at opposite sides of the body, threaded members in the brackets engaging and operating the dies, a pair of arms operating the threaded members, and one of the arms being provided with an operating handle within which the free end of the other arm is slidably seated.

2. A tool for shaping saw teeth comprising a grooved body, a member seating within the groove and pivotally connected at one end to the body and forming a rest for seating the body upon the teeth of a saw, means providing for lateral positioning of the body upon a saw, sleeves threaded in opposite sides of the body, dies slidably mounted within the sleeves, brackets at opposite sides of the body, threaded members in the brackets engaging and operating the dies, a pair of arms for operating the threaded members, one of the arms being provided with an operating handle within which the free end of the arm is slidably seated, a stationary member engaging one side of the saw blade, a threaded member for engaging the opposite side, a crank attached to the end of the last member, a rod having one end pivotally connected to the crank, a wrist pin mounted to one of the arms through which the rod passes, a member threaded upon the rod, and a spring between the wrist pin and the member threaded to the rod operating when the handle is moved in a direction to cause the dies to engage a saw tooth the last mentioned threaded member to grip the saw blade between it and the stationary member.

3. A tool for shaping saw teeth comprising a body provided with a groove to receive the toothed edge of a saw, dies mounted at one end thereof movable to engage opposite sides of a saw tooth including means for operating said dies, a bracket mounted at the opposite end of the body, means for adjustably positioning the bracket longitudinally of the body, a bar seated in the groove having one end pivotally connected to the bracket and adapted to rest upon the teeth of a saw, and a member threading through the top of the body and engaging the bar proximate its free end and raising and lowering the body thereabove and thereby raising and lowering the dies relative to the teeth.

4. A tool for shaping saw teeth, comprising a body constructed to seat upon the toothed edge of a saw, dies slidable to engage opposite sides of a saw tooth, an operating lever for operating the dies, and means for gripping the saw blade when the dies are operated comprising a stationary though adjustable screw member engaging one face of the saw blade, a second screw member engaging the opposite side of the blade, a connection between the second screw member and the operating lever for moving it by means of its threads toward and from the first screw accordingly as the dies engage and disengage a saw tooth, said connection comprising a wrist pin pivotally mounted upon the operating lever, a crank mounted upon the second screw member, an arm having one end pivoted to the crank and passing through the wrist pin, a spring coiled about the arm between the wrist pin and crank and having one end bearing upon the wrist pin, and a member adjustable along the arm upon which the other end of the spring bears.

GEORGE E. BODENHAMER.